United States Patent [19]

Noguchi

[11] Patent Number: 5,504,336

[45] Date of Patent: Apr. 2, 1996

[54] SPECTROFLUOROMETRIC APPARATUS FOR OBTAINING SPECTRAL IMAGE INFORMATION

[75] Inventor: Masaru Noguchi, Kanagawa, Japan

[73] Assignee: Fuji Photo Film Co., Ltd., Kanagawa, Japan

[21] Appl. No.: 245,561

[22] Filed: May 18, 1994

[30]   Foreign Application Priority Data

May 18, 1993   [JP]   Japan .................................... 5-115689

[51] Int. Cl.$^6$ .................................................. G01N 21/64
[52] U.S. Cl. ........................................ 250/458.1; 356/346
[58] Field of Search ............................. 250/458.1, 461.1, 250/461.2, 339.08; 356/346

[56]   References Cited

U.S. PATENT DOCUMENTS

| | | | |
|---|---|---|---|
| 4,772,125 | 9/1988 | Yoshimura et al. | 250/458.1 X |
| 4,937,457 | 6/1990 | Mitchell | 250/458.1 |
| 4,983,041 | 1/1991 | Inaba | 356/346 |
| 5,117,466 | 5/1992 | Buican et al. | 356/346 X |
| 5,208,651 | 5/1993 | Buican | 356/346 |
| 5,377,003 | 12/1994 | Lewis et al. | 250/458.1 X |

FOREIGN PATENT DOCUMENTS

| | | | |
|---|---|---|---|
| 63-236930 | 10/1988 | Japan | 356/346 |
| 1-173839 | 7/1989 | Japan | 356/346 |
| 2-145927 | 6/1990 | Japan | 356/346 |
| 4-32729 | 2/1992 | Japan | 356/346 |
| 8503122 | 7/1985 | WIPO | 356/346 |

OTHER PUBLICATIONS

"Multiplexed Spectral Imaging Technique—Fourier Transform Spectral Imaging—", Kazuyoshi ITOH; on The Review of Laser Engineering (Laser Kenkyu); vol. 15, No. 10, Oct. 1987, pp. 21–30.

Primary Examiner—Carolyn E. Fields
Assistant Examiner—Edward J. Glick
Attorney, Agent, or Firm—Sughrue, Mion, Zinn, Macpeak & Seas

[57]   ABSTRACT

A spectrofluorometric apparatus for obtaining spectral image information comprises a stimulating ray source, which produces a laser beam serving as stimulating rays, and a scanning device, which deflects the laser beam in two directions and causes the deflected laser beam to scan a sample. An optical system separates the fluorescence, which has been produced by the sample when the sample is exposed to the laser beam, from the optical path of the laser beam. A Fourier spectrometric system causes interference to occur with the fluorescence, which has been separated by the optical system from the optical path of the laser beam. The Fourier spectrometric system detects the brightness and darkness of the fluorescence, which are due to the interference, as a detection signal and carries out Fourier transformation on the detection signal. The spectrum of the fluorescence is thus measured for each point on the sample, and two-dimensional spectral image information of the sample is thereby obtained.

10 Claims, 3 Drawing Sheets

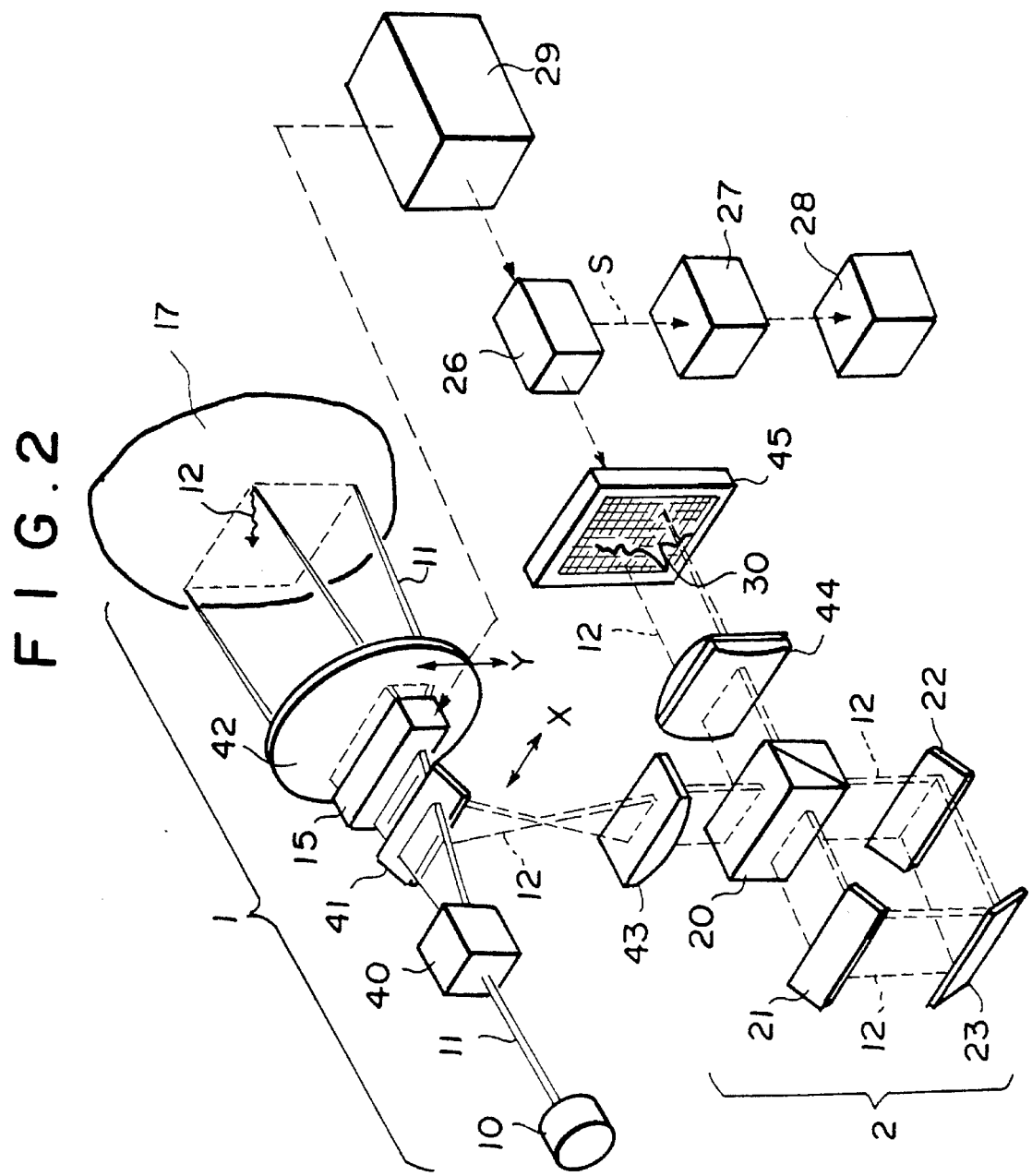
F I G. 2

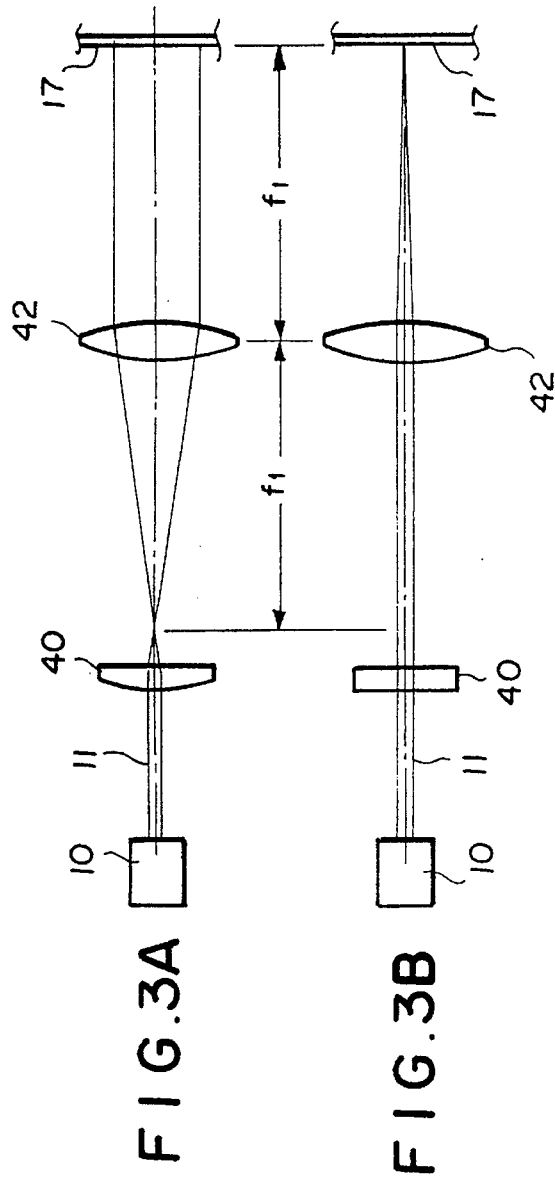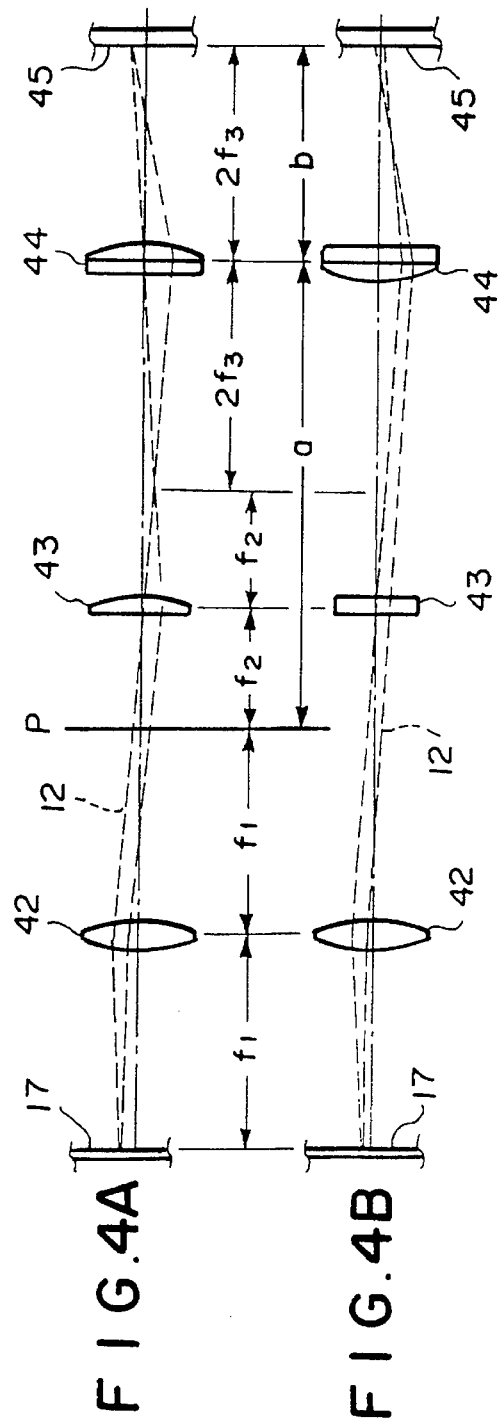

SPECTROFLUOROMETRIC APPARATUS FOR OBTAINING SPECTRAL IMAGE INFORMATION

BACKGROUND OF THE INVENTION

1. Field of the Invention

This invention relates to a spectrofluorometric apparatus for obtaining spectral image information, wherein a sample is exposed to a laser beam, which stimulates and causes the sample to produce fluorescence, and the spectrum of the fluorescence produced by the sample is measured for each point on the sample.

2. Description of the Prior Art

Various types of spectrometric apparatuses for measuring spectra of light, which is to be measured, have heretofore been used widely. As one of such spectrometric apparatuses, a Fourier spectrometric apparatus is known. With the Fourier spectrometric apparatus, the light to be measured is caused by an interferometer to interfere, and the brightness and darkness of the light, which have been produced by the interference, are detected as a signal. The detected signal is then subjected to Fourier transformation, and the spectrum of the light to be measured is thereby measured. Also, research has been carried out to develop Fourier spectrometric techniques for obtaining spectral image information, wherein a spectrum of light produced by an object having two-dimensional spread is measured for each point on the object by utilizing the Fourier spectrometric apparatus. Several types of such Fourier spectrometric techniques have been proposed as described in, for example, the magazine "Laser Kenkyu" (Laser Research), Vol. 15, No. 10, 21 (1987).

Also, an apparatus has been proposed, wherein a sample constituted of a fluorescent substance is exposed to a laser beam, which stimulates and causes the sample to produce fluorescence, and the spectrum of the fluorescence produced by a single point on the sample is measured. Further, an apparatus has been proposed, wherein a sample, which is constituted of a fluorescent substance and has two-dimensional spread, is scanned with a laser beam, which stimulates and causes the sample to produce fluorescence, and the intensity of the fluorescence produced by each point on the sample is measured, image information of the sample being thereby obtained.

As for a sample, such as a living body sample, which inhomogeneously contains a plurality of kinds of fluorescent substances, it is often desired that the spectrum of the fluorescence, which is produced by the sample when the sample is exposed to stimulating rays, can be measured for each point on the sample, and two-dimensional spectral image information of the sample can thereby be obtained. However, no apparatus has heretofore been provided which is capable of carrying out such spectrofluorometry for obtaining spectral image information.

SUMMARY OF THE INVENTION

The primary object of the present invention is to provide a spectrofluorometric apparatus for obtaining spectral image information, wherein a spectrum of fluorescence, which is produced by a sample when the sample is exposed to stimulating rays, is measured for each point on the sample, and two-dimensional spectral image information of the sample is thereby obtained.

Another object of the present invention is to provide a spectrofluorometric apparatus for obtaining spectral image information, wherein two-dimensional spectral image information of a sample is obtained quickly.

The present invention provides a first spectrofluorometric apparatus for obtaining spectral image information, comprising:

i) a stimulating ray source, which produces a laser beam serving as stimulating rays, ii) a scanning means, which deflects the laser beam in two directions and causes the deflected laser beam to scan a sample, iii) an optical system for separating the fluorescence, which has been produced by the sample when the sample is exposed to the laser beam, from the optical path of the laser beam, and iv) a Fourier spectrometric system for causing interference to occur with the fluorescence, which has been separated by the optical system from the optical path of the laser beam, the Fourier spectrometric system thereafter detecting the brightness and darkness of the fluorescence, which are due to the interference, as a detection signal and carrying out Fourier transformation on the detection signal.

The present invention also provides a second spectrofluorometric apparatus for obtaining spectral image information, comprising:

i) a stimulating ray source, which produces a laser beam serving as stimulating rays and having linear spread, ii) a scanning means, which deflects the laser beam in a direction that intersects with the direction of the spread of the laser beam, the scanning means thereafter causing the deflected laser beam to scan a sample, iii) an optical system for separating the fluorescence, which has been produced by the sample when the sample is exposed to the laser beam, from the optical path of the laser beam, and iv) a Fourier spectrometric system for causing interference to occur with the fluorescence, which has been separated by the optical system from the optical path of the laser beam, the Fourier spectrometric system thereafter detecting the brightness and darkness of the fluorescence, which are due to the interference of the fluorescence having been produced from each position on the sample exposed to the laser beam, in parallel as a detection signal and carrying out Fourier transformation on each of the detection signals, which have thus been obtained for the respective positions on the sample exposed to the laser beam.

In the second spectrofluorometric apparatus for obtaining spectral image information in accordance with the present invention, as the stimulating ray source, a combination of a laser beam source, which has a single point of light emission, and a means for shaping a single ordinary laser beam, which has been produced by the laser beam source, into a fan beam form may be utilized. Alternatively, a laser beam source having an array of a plurality of light emission points may be utilized as the stimulating ray source.

With the first spectrofluorometric apparatus for obtaining spectral image information in accordance with the present invention, the position on the sample, which is scanned with the laser beam and stimulated thereby, changes as the laser beam is deflected. Therefore, spectrofluorometry is carried out for each point on the sample, and two-dimensional spectral image information of the sample can thereby be obtained.

With the second spectrofluorometric apparatus for obtaining spectral image information in accordance with the present invention, the spectral image information of the sample can be obtained basically in the same manner as that in the first spectrofluorometric apparatus for obtaining spectral image information in accordance with the present invention. In particular, with the second spectrofluorometric apparatus for obtaining spectral image information in accordance with the present invention, the sample is scanned with the laser beam having linear spread. Therefore, spectrofluorometry can be carried out in parallel for the respective points standing in a line on the sample. Accordingly, with the second spectrofluorometric apparatus for obtaining spectral image information in accordance with the present invention, the spectral image information of the sample can be obtained more quickly than with the first spectrofluorometric apparatus for obtaining spectral image information in accordance with the present invention.

BRIEF DESCRIPTION OF THE DRAWINGS

FIG. 2 is a schematic perspective view showing a second embodiment of the spectrofluorometric apparatus for obtaining spectral image information in accordance with the present invention, FIG. 3A is a plan view showing part of an optical system in the second embodiment of FIG. 2, FIG. 3B is a side view showing part of the optical system shown in FIG. 3A, FIG. 4A is a plan view showing part of a different optical system in the second embodiment of FIG. 2, and FIG. 4B is a side view showing part of the optical system shown in FIG. 4A.

DESCRIPTION OF THE PREFERRED EMBODIMENTS

Figure 1:
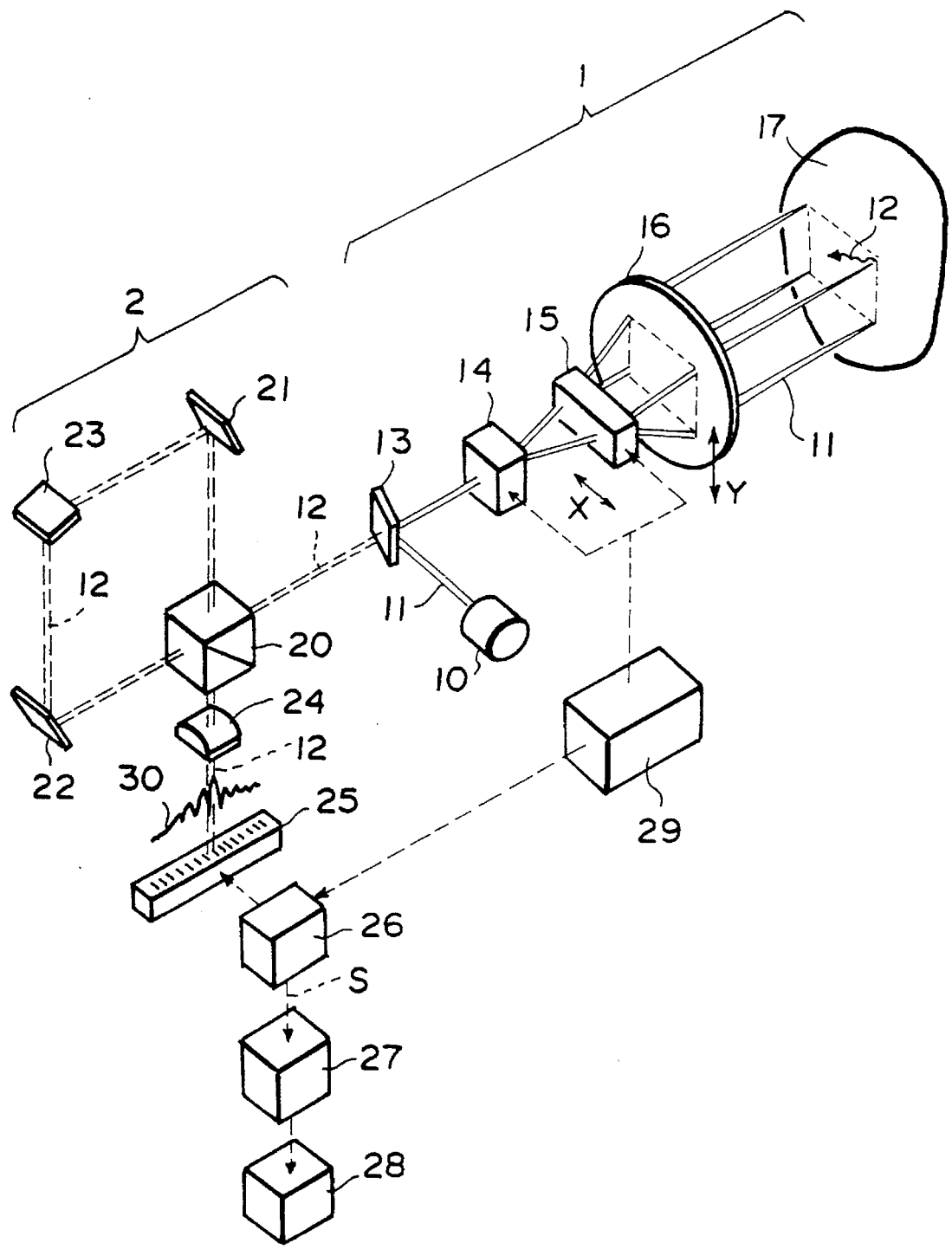
FIG. 1 is a schematic perspective view showing a first embodiment of the spectrofluorometric apparatus for obtaining spectral image information in accordance with the present invention.

The present invention will hereinbelow be described in further detail with reference to the accompanying drawings.

FIG. 1 shows a first embodiment of the spectrofluorometric apparatus for obtaining spectral image information in accordance with the present invention. As illustrated in FIG. 1, the spectrofluorometric apparatus for obtaining spectral image information comprises a laser stimulation system 1 and a Fourier spectrometric system 2.

The laser stimulation system 1 comprises a stimulating laser 10, which produces a laser beam 11 serving as stimulating rays, and a dichroic mirror 13. The dichroic mirror 13 reflects the laser beam 11 with a high reflectivity and transmits fluorescence 12 with a high transmittance. Ordinarily, the fluorescence 12 has a wavelength longer than the wavelength of the laser beam 11. The laser stimulation system 1 also comprises a horizontal beam deflector 14, which deflects the laser beam 11 horizontally (i.e. in the directions indicated by the double headed arrow X), and a vertical beam deflector 15. The vertical beam deflector 15 deflects the laser beam 11, which has passed through the horizontal beam deflector 14, vertically (i.e. in the directions indicated by the double headed arrow Y). The laser stimulation system 1 further comprises a condensing lens 16 for converging the laser beam 11, which has passed through the vertical beam deflector 15, on a sample 17 constituted of a fluorescent substance.

By way of example, the stimulating laser 10 may be constituted of an $N_2$ laser, which produces a laser beam having a wavelength of 337 nm, an Ar laser, which produces a laser beam having a wavelength of 333 nm, 458 nm, 488 nm, or 515 nm, or a XeCl laser, which produces a laser beam having a wavelength of 308 nm. As the combination of the horizontal beam deflector 14 and the vertical beam deflector 15, a combination of two reflection-type beam deflectors, such as galvanometer mirrors and rotating polygon mirrors, should preferably be used. The condensing lens 16 also serves as a pickup lens for collecting the fluorescence 12, which is produced by the sample 17 when the sample 17 is exposed to and stimulated by the laser beam 11. Therefore, the condensing lens 16 should preferably have as large a light receiving solid angle as possible, i.e., as large an aperture as possible. Also, the condensing lens 16 should preferably have a high transmittance with respect to both the laser beam 11 and the fluorescence 12.

The Fourier spectrometric system 2 comprises a beam splitter 20 located at the position, upon which the fluorescence 12 having passed through the dichroic mirror 13 impinges, and a mirror 21 for reflecting the fluorescence 12, which has been reflected by the beam splitter 20. The Fourier spectrometric system 2 also comprises a mirror 22 for reflecting the fluorescence 12, which has passed through the beam splitter 20, and a tilting mirror 23 for reflecting the fluorescence 12, which has been reflected by the mirror 21, towards the mirror 22 and reflecting the fluorescence 12, which has been reflected by the mirror 22, towards the mirror 21. The fluorescence 12 is thus split into two beams by the beam splitter 20, and the two split beams are then combined by the beam splitter 20 to again form the fluorescence 12. The Fourier spectrometric system 2 further comprises a cylindrical lens 24 for condensing the fluorescence 12, which has been obtained from the beam splitter 20 by combining the two split beams, only in one direction. The Fourier spectrometric system 2 still further comprises an array-like photodetector (an array sensor) 25 extending in the direction normal to the direction along which the fluorescence 12 is condensed by the cylindrical lens 24. The Fourier spectrometric system 2 also comprises a sensor driving means 26, which drives the array sensor 25, a memory 27, which temporarily stores an output signal obtained from the array sensor 25, and a signal processing means 28.

The array sensor 25 is constituted of a one-dimensional photodiode array, a one-dimensional CCD array, or the like. The array sensor 25 is controlled by a synchronization control means 29 such that the operation of the array sensor 25 may be synchronized with the two-dimensional scanning of the laser beam 11 carried out by the horizontal beam deflector 14 and the vertical beam deflector 15.

The sample 17 is a sample having two-dimensional spread, such as a sample of a living body. When spectrofluorometry is to be carried out with this embodiment in order to obtain spectral image information of the sample 17, the stimulating laser 10 is operated in order to produce the laser beam 11. Also, the horizontal beam deflector 14 and the vertical beam deflector 15 are operated, and the sample 17 is scanned with the laser beam 11 in two directions. When the sample 17 is exposed to the laser beam 11, the exposed portion of the sample 17 is stimulated by the laser beam 11 and produces the fluorescence 12.

Part of the fluorescence 12, which has been produced by the sample 17, is condensed by the condensing lens 16 and follows the optical path reverse to the optical path of the laser beam 11. Thereafter, the fluorescence 12 passes through the dichroic mirror 13 and impinges upon the beam splitter 20. The fluorescence 12 is split by the beam splitter 20 into two components. One of the two split components follows the optical path of the beam splitter 20→the mirror 21→the tilting mirror 23→the mirror 22→the beam splitter 20. The other component follows the optical path of the beam splitter 20→the mirror 22→the tilting mirror 23→the mirror 21→the beam splitter 20. The two split components are then combined with each other by the beam splitter 20. The tilting mirror 23 is located in a direction such that the angle of incidence of the fluorescence 12, which comes from the mirror 21, upon the tilting mirror 23 and the angle of incidence of the fluorescence 12, which comes from the mirror 22, upon the tilting mirror 23 may be slightly different from each other. Therefore, the two split components are combined together such that they may make a small finite angle therebetween.

Thereafter, the fluorescence 12 is condensed by the cylindrical lens 24. At this time, spatial interference fringes (i.e. an interferogram) occur with the condensed fluorescence 12 in the direction normal to the direction along which the fluorescence 12 is condensed by the cylindrical lens 24. The interferogram is caused to occur by the phase difference due to the small finite angle between the aforesaid two split components of the fluorescence 12. In FIG. 1, the interferogram is schematically represented by reference numeral 30. The interferogram 30 is detected by the array sensor 25, and an output signal S produced by the array sensor 25 is temporarily stored in the memory 27. As described above, the array sensor 25 is controlled by the synchronization control means 29 such that the operation of the array sensor 25 may be synchronized with the two-dimensional scanning of the laser beam 11. Therefore, the interferogram 30 is obtained for each position on the sample 17 which is exposed to the laser beam 11.

The signals S stored in the memory 27 are then read one after another from the memory 27 and fed into the signal processing means 28. By way of example, the signal processing means 28 is constituted of a known computer. The signal processing means 28 carries out Fourier transformation on the signal S representing the interferogram obtained for each position on the sample 17 which is exposed to the laser beam 11. The Fourier transformation is of the same type as a conventional Fourier transformation. From the Fourier transformation, the spectrum of the fluorescence 12 is obtained for each picture element, i.e. for each position on the sample 17 which is exposed to the laser beam 11. In this manner, two-dimensional spectral image information of the sample 17 can be obtained. The spectral image information is displayed on a display means (not shown), such as a CRT display device, or is recorded on a recording means (not shown).

A second embodiment of the spectrofluorometric apparatus for obtaining spectral image information in accordance with the present invention will be described hereinbelow with reference to FIG. 2. In FIG. 2, similar elements are numbered with the same reference numerals with respect to FIG. 1.

With reference to FIG. 2, the second embodiment is provided with a fan beam forming optical system 40 in lieu of the horizontal beam deflector 14, which is employed in the first embodiment. The laser beam 11, which has been produced by the stimulating laser 10, is shaped by the fan beam forming optical system 40 into a fan beam having a shape such that the laser beam 11 may be spread in the horizontal plane (i.e. in the plane containing the double headed arrow X). Thereafter, the laser beam 11 passes through a dichroic mirror 41. The laser beam 11 is condensed by a condensing lens 42 such that it may be collimated in the horizontal plane and converged in the vertical plane. The sample 17 is located at the position at which the laser beam 11 is converged in the vertical plane. Therefore, a horizontally-extending linear portion of the sample 17 is simultaneously exposed to the laser beam 11. Also, the laser beam 11 is deflected by the vertical beam deflector 15 in the vertical direction (i.e. in the direction indicated by the double headed arrow Y). In this manner, the sample 17 is scanned with the laser beam 11 in two directions.

The fan beam forming optical system 40 is constituted of a cylindrical lens, a cylindrical mirror, or the like, which is concave or convex and has power only in the horizontal plane. The condensing lens 42 may typically be constituted of an axisymmetric convex lens. FIG. 3A is a plan view showing part of the optical system in the second embodiment of FIG. 2. FIG. 3B is a side view showing part of the optical system shown in FIG. 3A. As illustrated in FIGS. 3A and 3B, the condensing lens 42 constituted of the axisymmetric convex lens is located such that the front focal point may be located at the (real or virtual) point of convergence of the fan beam-like laser beam 11 and such that the back focal point may be located at the position of the sample 17. In FIGS. 3A and 3B, $f_1$ represents the focal length of the condensing lens 42, and mirrors are omitted.

When the sample 17 is exposed to the laser beam 11, the exposed linear portion of the sample 17 produces the fluorescence 12. Part of the fluorescence 12, which has been produced by the sample 17, is condensed by the condensing lens 42 and follows the optical path reverse to the optical path of the laser beam 11. Thereafter, the fluorescence 12 is reflected by the dichroic mirror 41. The fluorescence 12, which has thus been separated from the optical path of the laser beam 11, passes through a cylindrical lens 43 and then impinges upon the beam splitter 20. The fluorescence 12, which has been separated from the optical path of the laser beam 11, impinges upon the beam splitter 20 such that the fluorescence 12 may take on the form of a collimated beam in the vertical plane, which is normal to the direction indicated by the double headed arrow X. The fluorescence 12 is split by the beam splitter 20 into two components. The two split components are caused by the mirrors 21, 22 and the tilting mirror 23 to make a small finite angle therebetween and are then combined with each other by the beam splitter 20. Thereafter, the fluorescence 12 is condensed by an anamorphic lens 44 in the horizontal and vertical directions.

The spatial interferogram 30 occurs with the condensed fluorescence 12 in the vertical direction. The interferogram 30 is caused to occur by the phase difference due to the small finite angle between the aforesaid two split components of the fluorescence 12. The interferogram 30 occurs for each point on the linear portion of the sample 17 that has been exposed to the laser beam 11. A plurality of interferograms 30, 30, . . . for the respective points on the linear portion of the sample 17 stand side by side in the directions indicated by the double headed arrow X on a two-dimensional array sensor 45. (In FIG. 2, only a single interferogram 30 is shown schematically.) The plurality of the interferograms 30, 30, . . . standing side by side are detected in parallel by the two-dimensional array sensor 45, which may be constituted of a photodiode array, a CCD array, or the like.

FIG. 4A is a plan view showing a typical example of the optical path which the fluorescence 12 follows in the second embodiment of FIG. 2. FIG. 4B is a side view showing the typical example of the optical path which the fluorescence 12 follows in the second embodiment of FIG. 2. In FIGS. 4A and 4B, $f_1$ represents the focal length of the condensing lens 42, $f_2$ represents the focal length of the cylindrical lens 43, and $f_3$ represents the focal length of the anamorphic lens 44 in the horizontal plane. In FIGS. 4A and 4B, mirrors are omitted. Specifically, as illustrated in FIG. 4A, in the horizontal plane, the sample 17 and the two-dimensional array sensor 45 should be conjugate with each other. Also, as illustrated in FIG. 4B, in the vertical plane, the plane P and the two-dimensional array sensor 45 should be conjugate with each other such that, even if the laser beam 11 is deflected vertically, the fluorescence 12 may not move on the two-dimensional array sensor 45. More specifically, the relationship of $1/a+1/b=1/f_3'$ should be satisfied wherein $f_3'$ represents the focal length of the anamorphic lens 44 in the vertical plane, $a=2(f_2+f_3)$, and $b=2f_3$.

The output signals S generated by the two-dimensional array sensor 45 are temporarily stored in the memory 27 and then read one after another from the memory 27. In this manner, the signal S representing a single interferogram 30 (i.e., the signal generated by the light receiving elements of the two-dimensional array sensor 45, which stand in a line in the vertical direction) is fed into the signal processing means 28. The signal processing means 28 carries out Fourier transformation on the signal S representing the single interferogram 30. From the Fourier transformation, the spectrum of the fluorescence 12 is obtained for each picture element, i.e. for each point on the linear portion of the sample 17 which is exposed to the laser beam 11.

The Fourier transformation is carried out on all of the signals S representing the interferograms 30, 30, ..., and one-dimensional spectral image information of the sample 17 is thereby obtained. Also, the processing described above is carried out each time the laser beam 11 is deflected vertically at a predetermined pitch by the vertical beam deflector 15. Therefore, two-dimensional spectral image information of the sample 17 can be obtained. The spectral image information is displayed on a display means (not shown), such as a CRT display device, or is recorded on a recording means (not shown).

As described above, with the second embodiment, the interferograms 30, 30, ... with respect to the points on the linear portion of the sample 17, which are exposed to the laser beam 11, are detected in parallel. Therefore, the two-dimensional spectral image information of the sample 17 can be obtained more quickly than with the first embodiment.

In the two embodiments described above, the spatial interferogram is produced by the effects of the tilting mirror 23. Alternatively, instead of the square optical path being employed as in the aforesaid embodiments, the optical path between the beam splitting by the beam splitter 20 and the beam combining by the beam splitter 20 may take on the form of a triangular path. One of mirrors located at the vertexes of the triangular path may then be moved reciprocally in order to modulate the optical path length of the fluorescence 12. In such cases, a temporal interferogram is produced. Therefore, in the first embodiment of FIG. 1, in order to detect the temporal interferogram, a single photodetector may be employed in lieu of the one-dimensional array sensor 25. In the second embodiment of FIG. 2, in order to detect the temporal interferogram, a horizontally-extending one-dimensional array sensor may be employed in lieu of the two-dimensional array sensor 45. Also, in such cases, in the first embodiment of FIG. 1, an ordinary axisymmetric lens may be employed in lieu of the cylindrical lens 24.

In the first embodiment of FIG. 1 or in the second embodiment of FIG. 2, a shading phenomenon of the optical system will occur due to nonuniformity in the stimulating laser power, nonuniformity in the fluorescence condensing efficiency of the condensing lens 16 or 42, and the like. Therefore, processing for compensation for the shading phenomenon may be carried out on the output signal S obtained from the one-dimensional array sensor 25 or the two-dimensional array sensor 45. Also, in the one-dimensional array sensor 25 or the two-dimensional array sensor 45, the sensitivity or the spectral characteristics may vary for different light receiving elements. Therefore, processing for compensating for the variations in such characteristics may be carried out on the output signal S obtained from the one-dimensional array sensor 25 or the two-dimensional array sensor 45.

What is claimed is:

1. A spectrofluorometric apparatus for obtaining spectral image information, comprising:
    i) a stimulating ray source, which produces a laser beam having a single wavelength and serving as stimulating rays,
    ii) a scanning means, which deflects the laser beam in two directions and causes the deflected laser beam to scan a sample,
    iii) an optical system for separating fluorescence, which has been produced by the sample when the sample is exposed to the laser beam, from the optical path of the laser beam, and
    iv) a Fourier spectrometric system for causing interference to occur with the fluorescence, which has been separated by the optical system from the optical path of the laser beam, the Fourier spectrometric system thereafter condensing the fluorescence and detecting the brightness and darkness of the fluorescence, which are due to the interference, as a detection signal and carrying out Fourier transformation on the detection signal.

2. An apparatus as defined in claim 1 wherein the sample is a living body sample.

3. An apparatus as defined in claim 1 wherein said Fourier spectrometric system includes a sensor extending in a direction normal to a condensing direction of the fluorescence for detecting the brightness and darkness of the fluorescence, and wherein processing for compensation for a shading phenomenon of the optical system is carried out on the output signal obtained from the sensor by a processing means.

4. An apparatus as defined in claim 1 wherein said Fourier spectrometric system includes a sensor extending in a direction normal to a condensing direction of the fluorescence for detecting the brightness and darkness of the fluorescence, and wherein processing for compensation for a variation in the sensitivity or spectral characteristics of the sensor is carried out on the output signal obtained from the sensor by a processing means.

5. A spectrofluorometric apparatus for obtaining spectral image information, comprising:
    i) a stimulating ray source, which produces a laser beam serving as stimulating rays and having linear spread and a single wavelength,
    ii) a scanning means, which deflects the laser beam in a direction that intersects with the direction of the spread of the laser beam, the scanning means thereafter causing the deflected laser beam to scan a sample,
    iii) an optical system for separating fluorescence, which has been produced by the sample when the sample is exposed to the laser beam, from the optical path of the laser beam, and iv) a Fourier spectrometric system for causing interference to occur with the fluorescence, which has been separated by the optical system from the optical path of the laser beam, the Fourier spectrometric system thereafter detecting the brightness and darkness of the fluorescence, which are due to the interference of the fluorescence having been produced from each position on the sample exposed to the laser beam, in parallel as a detection signal and carrying out Fourier transformation on each of the detection signals, which have thus been obtained for the respective positions on the sample exposed to the laser beam.

6. An apparatus as defined in claim 5 wherein the stimulating ray source comprises a laser beam source, which has a single point of light emission, and a means for shaping a laser beam, which has been produced by the laser beam source, into a fan beam form.

7. An apparatus as defined in claim 5 wherein the stimulating ray source comprises a laser beam source having an array of a plurality of light emission points.

8. An apparatus as defined in claim 5 wherein the sample is a living body sample.

9. An apparatus as defined in claim 5 wherein said Fourier spectrometric system includes a sensor extending along the scanning direction of said laser beam, and wherein processing for compensation for a shading phenomenon of the optical system is carried out on the output signal obtained from the sensor by a processing means.

10. An apparatus as defined in claim 5 wherein said Fourier spectrometric system includes a sensor extending along the scanning direction of said laser beam, and wherein processing for compensation for a variation in the sensitivity or spectral characteristics of the sensor is carried out on the output signal obtained from the sensor by a processing means.

* * * * *